United States Patent [19]

Kita

[11] 4,432,241
[45] Feb. 21, 1984

[54] KARMAN VORTEX TYPE FLOW MEASURING APPARATUS

[75] Inventor: Toru Kita, Yokohama, Japan

[73] Assignee: Nissan Motor Co., Ltd., Yokohama, Japan

[21] Appl. No.: 103,742

[22] Filed: Dec. 14, 1979

[30] Foreign Application Priority Data

Dec. 15, 1978 [JP] Japan .................................. 53-154104

[51] Int. Cl.³ .............................................. G01F 1/32
[52] U.S. Cl. .................................................. 73/861.22
[58] Field of Search ............ 73/861.22, 861.23, 861.24

[56] References Cited

U.S. PATENT DOCUMENTS 3,810,388 5/1974 Cousins ............................. 73/861.22

OTHER PUBLICATIONS

Tsuchiya et al., "Current Meters Utilizing Karmen Vortex Streets Report #1-Basic Experiments in Open Waterway", in Proc. Japan Soc. Mec. Eng., No. 167, 1967, pp. 97–100.

Morkovin, "Flow Around Circular Cylinder-A Kaleidoscope of Challenging Fluid Phenomena", in Symposium on Fully Separated Flows, May 1964.

Primary Examiner—Herbert Goldstein
Attorney, Agent, or Firm—Schwartz, Jeffery, Schwaab, Mack, Blumenthal & Koch

[57] ABSTRACT

A Karman vortex type flow measuring apparatus comprises a duct (1) for a fluid whose flow rate or flow velocity is to be measured, and a columnar vortex shedding member (2) extending within the duct transversely of the fluid flow direction. The fluid flow near the vortex shedding member has a width (X) of which the ratio (X/D) to the width (D) of the vortex shedding member lies within the range between 3 and 4. A highly accurate measurement can be achieved independently of the cross-sectional configuration of the duct and for a wide range of the fluid flow rate or flow velocity.

2 Claims, 14 Drawing Figures

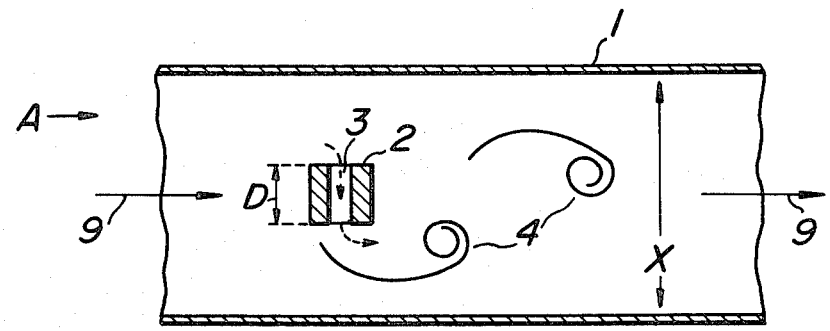
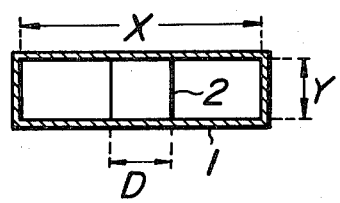
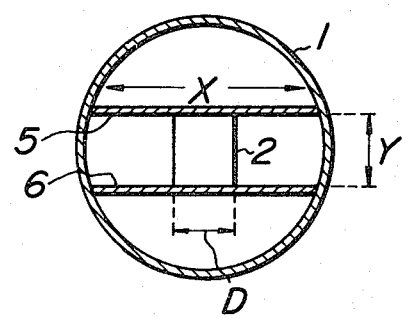

KARMAN VORTEX TYPE FLOW MEASURING APPARATUS

The present invention relates to a Karman vortex type flow measuring apparatus and more particularly, to such an apparatus wherein the vortex shedding is stabilized.

As is well known in the art and shown in FIG. 1A, Karman vortex type flow measuring apparatus comprises conventionally a duct 1 through which flows a fluid whose flow rate or flow velocity is to be measured, and a vortex shedding member 2 which is of columnar configuration and extends within the duct 1 transversely of the flow direction 9. With this arrangement, Karman vortices 4 are induced by, and shed from the opposite sides of the vortex shedding member 2. The frequency of the vortex shedding is proportional to the flow velocity and hence, to the flow rate. Detection of the vortex shedding frequency can be effected by means of a sensor, not shown, which may be a hot wire supplied with a constant current and disposed within a through bore 3 formed through the vortex shedding member 2, by detecting the flow acceleration within the through bore 3 induced by each vortex shedding.

In the above-mentioned conventional apparatus, stable Karman vortex train is generated in a limited range of the flow velocity. In terms of the Reynold's number, the range is between approximately 3,000 and 45,000. If the Reynold's number varies beyond the upper or the lower limit, vortices will not be shed in a stable manner resulting in deterioration of accuracy of the measurement. Stabilization of the vortex shedding is particularly important when the Karman vortex type flow measuring apparatus is used to detect the amount of the suction air to be supplied to a vehicle engine, since the amount of the suction air varies remarkably and suddenly in accordance with the driving condition.

Various proposals have heretofore been made to stabilize the vortex shedding by making use of two dimensional flow around the vortex shedding member. In order to obtain such a two dimensional flow, as shown in FIG. 1B for example, an extremely flat duct of rectangular cross-section is used whose height Y extending in the longitudinal direction of the vortex shedding member is smaller than its width X extending in a direction perpendicular to the longitudinal direction and to the flow direction. With the width D of the vortex shedding member measured in the direction in parallel with the width X, typically, the duct is so shaped that the following conditions are satisfied:

$$Y \leq 2D \quad (1)$$

$$x > 5Y \quad (2)$$

Alternatively, as shown in FIG. 2, a two dimensional flow can be obtained by a duct of circular cross-section provided therein with two partitions 5, 6 which define a passage for the fluid satisfying the conditions (1) and (2) in a similar manner.

Both of the measures referred to above proved to be effective at a relatively low velocity of the fluid, or at a Reynold's number of less than 2,000. However, they do not provide a remarkable effect in a relatively high velocity range and may sometimes affect the stability of the vortex shedding. Another disadvantage of the above-mentioned proposals is that the duct must be extremely flat in its cross-section, which is difficult and expensive to manufacture. Thus, a readily available duct having a circular or square cross-section can not be used.

An object of the present invention is to provide an improved Karman vortex type flow measuring apparatus which, for a wide range of the flow rate, is capable of shedding Karman vortices in a stable manner, and assures a highly accurate measurement.

The present invention is based on the recognition that the stability of the vortex shedding has a close relation to the cross-sectional dimension of the fluid flow near the vortex shedding member. It has been experimentally proved that a remarkable improvement in the stability of the vortex shedding can be achieved by selecting the cross-sectional dimension of the fluid flow near the vortex shedding member such that the ratio of width of the fluid flow to that of the vortex shedding member lies within the range between approximately 3 and 4, both widths being measured in a direction perpendicular to the flow direction of the fluid and to the longitudinal direction of the vortex shedding member.

According to the present invention, the width of the fluid flow near the vortex shedding member may be defined by the distance between two plain partitions extending within the duct on both sides of the vortex shedding member in parallel with the flow direction of the fluid and with the longitudinal direction of the vortex shedding member. Alternatively, the width of the fluid flow near the vortex shedding member may be defined by portions of the duct which are plain and in parallel with the flow direction of the fluid and with the longitudinal direction of the vortex shedding member.

With the arrangement according to the present invention, a remarkable stabilization of the vortex shedding can be achieved without using an extremely flat duct. As will be explained hereinafter, a highly accurate measurement can be effected independently of the cross-sectional shape of the duct.

The present invention will now be explained with reference to some preferred embodiments shown in the drawings, wherein:

FIGS. 1A and 1B are a longitudinal-sectional view and a cross-sectional view, respectively, showing the conventional apparatus as mentioned above;

FIG. 2 is a cross-sectional view similar to FIG. 1B but showing another example of the conventional apparatus also mentioned above;

Figure 7A:
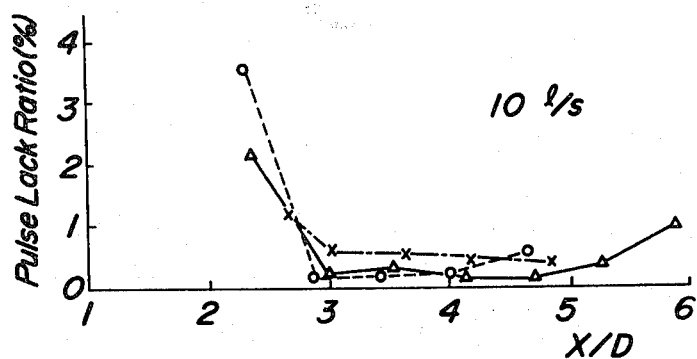
Figure 7B:
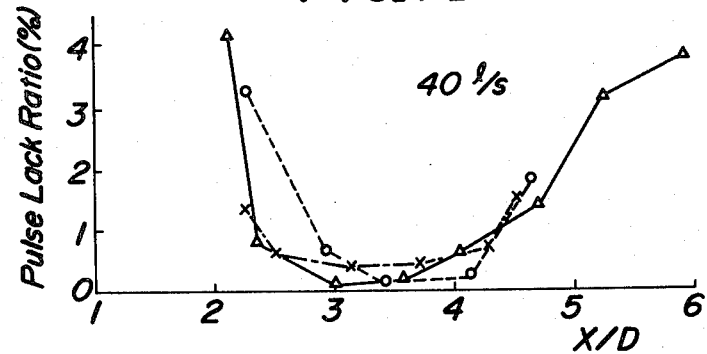
Figure 7C:
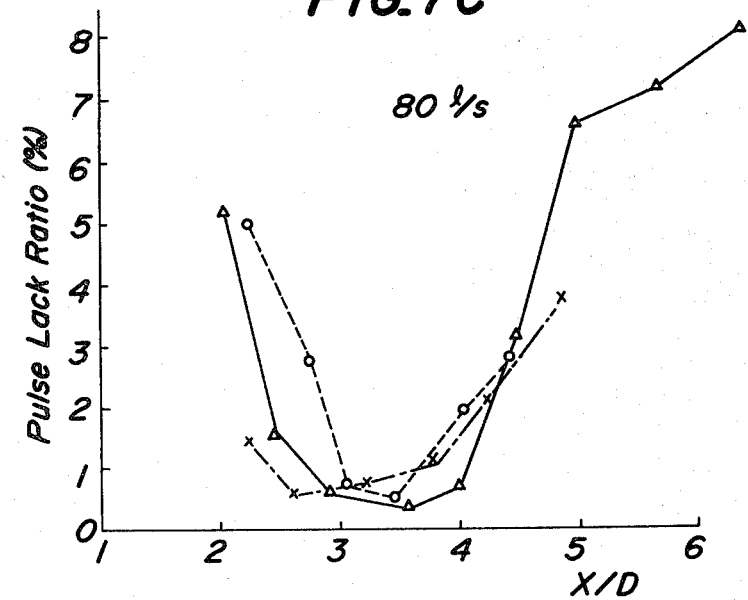
Figure 8:
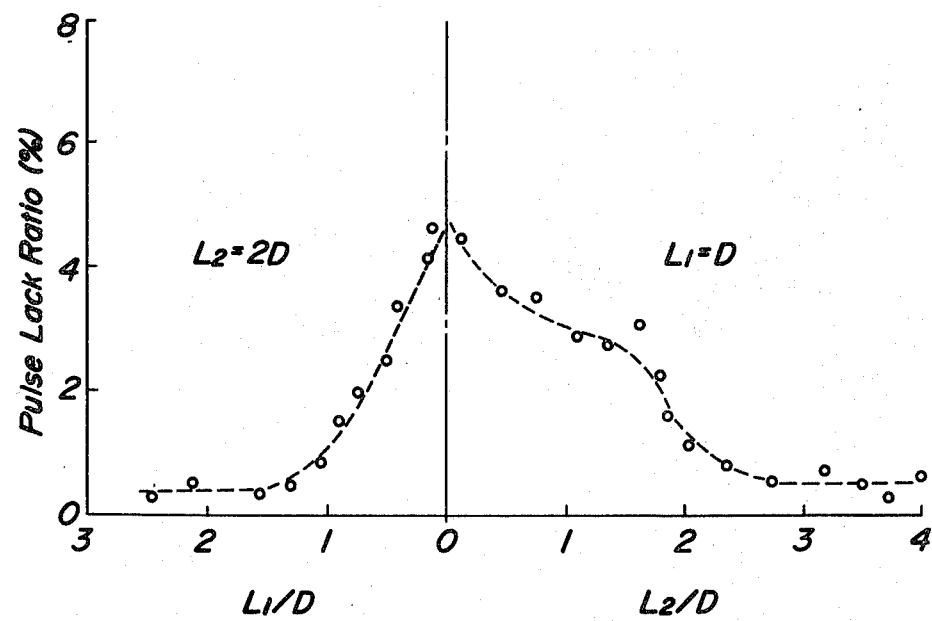

FIGS. 7A, 7B and 7C are diagrams showing the relation between the pulse lack ratio in percentage and the ratio X/D of the width of the fluid to that of the vortex shedding member; and FIG. 8 is a diagram showing the relation between the pulse lack ratio and the ratios $L_1/D$ and $L_2/D$ of the length of the upstream portion and the length of the down stream portion of the width of the vortex shedding member, respectively.

Throughout the figures, identical or similar parts are denoted by identical reference numerals.

Figure 3A:
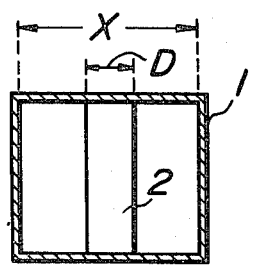
FIGS. 3A and 3B are a cross-sectional view and a longitudinal-sectional view, respectively, showing the apparatus according to a first embodiment of the present invention.
Figure 3B:
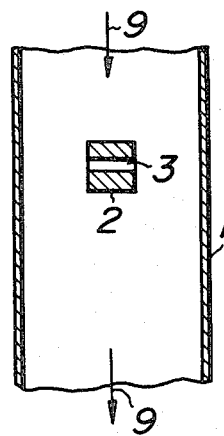

Referring now to FIGS. 3A and 3B, the Karman vortex type flow measuring apparatus according to the first embodiment of the present invention comprises a duct 1 which is of square cross-section. The width X of the fluid flow near the vortex shedding member 2 is defined by the distance between the opposing inner surfaces of the wall of the duct 1, which are in parallel with the longitudinal direction of the vortex shedding member 2 and with the flow direction 9 of the fluid.

Figure 4A:
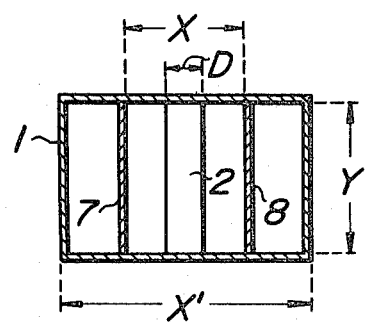
FIGS. 4A and 4B are a cross-sectional view and a longitudinal-sectional view, respectively, showing the apparatus according to a second embodiment of the present invention.
Figure 4B:
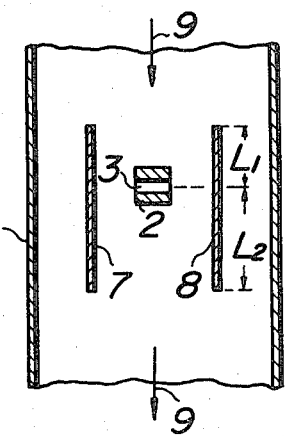

According to the second embodiment of the present invention shown in FIGS. 4A and 4B, the duct 1 is of square cross-section and is provided therein a pair of partitions 7, 8 which are disposed on both sides of the vortex shedding member 2 and extend in parallel with the side walls of the duct 1. The distance X between the partitions 7, 8 defines the width of the fluid flow near the vortex shedding member 2.

Figure 5A:
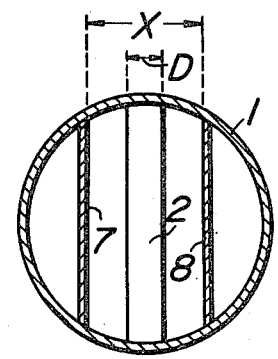
FIGS. 5A and 5B are a cross-sectional view and a longitudinal-sectional view, respectively, showing the apparatus according to a third embodiment of the present invention.
Figure 5B:
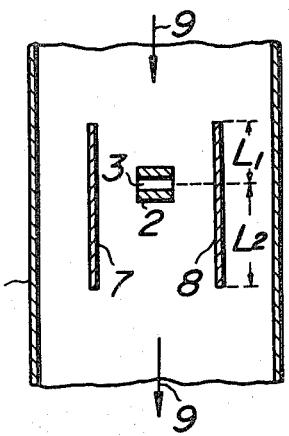

The third embodiment shown in FIGS. 5A and 5B is identical to the second embodiment except that the duct 1 is of circular cross-section.

Figure 6:
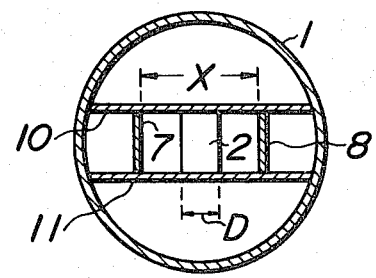
FIG. 6 is a cross-sectional view showing the apparatus according to a fourth embodiment of the present invention.

According to the fourth embodiment shown in FIG. 6, upper and lower ends of the vortex shedding member 2 and of the partitions 7, 8 are not directly secured to the inner wall of the duct 1 having a circular cross-section, but through a pair of vertically spaced horizontal partitions 10, 11. In this case also, the width of the fluid flow near the vortex shedding member 2 is defined by the distance X between the vertical partitions 7, 8.

In the embodiments shown in FIGS. 4A, 4B, 5A, 5B and 6, each of the partitions 7, 8 consists of a first portion extending upstream of the center of the vortex shedding member 2 and having a length $L_1$ measured in the flow direction, and a second portion extending downstream of the center of the vortex shedding member 2 and having a length $L_2$ measured in the flow direction. With reference to the width D of the vortex shedding member 2, the length $L_1$ and the length $L_2$ are respectively determined such that the following conditions are satisfied:

$$L_1/D \geq 1$$

and $$L_2/D \geq 2$$

The reason for this will be explained hereinafter with reference to FIG. 8.

Furthermore, in all the embodiments of the present invention, the ratio X/D of the width X of the fluid flow to the width D of the vortex shedding member is selected to be within the range between 3 and 4.

This range of the ratio X/D proved to provide a remarkable improvement in the stability of the vortex shedding, which is represented by the decrease in the pulse lack ratio. Since each of the vortex shedding is detected by a sensor, not shown, and each of the vortices is represented by an output pulse signal of the sensor, if some of the vortices are not properly shed due to the turbulence of the fluid flow, there will be corresponding lacks of pulse generation.

FIGS. 7A to 7C represent curves obtained by experiments, and show the pulse lack ratio in percentage, in terms of the ratio X/D, with the apparatus shown in FIGS. 4A and 4B, in which the length $L_1$ of the upstream portions of partitions 7, 8 equals 2D, and the length $L_2$ of the downstream portions of partitions 7, 8 equals 3D. Various ducts each having a different width (X') to height (Y) ratio X'/Y have been used. In FIGS. 7A to 7C, full lines, broken lines and dash-dot lines respectively correspond to each duct whose width to height ratio X'/Y is 6, 3 and 1.8. Curves shown in FIGS. 7A, 7B and 7C were obtained with the flow rate of 10 l/s, 40 l/s, and 80 l/s, respectively.

As can be appreciated from the curves shown in FIGS. 7A to 7C, the pulse lack ratio increases as the ratio X/D varies to be less than 3 or more than 4. This is remarkable particularly in the high flow rate condition (FIG. 7C), when the Reynold's number exceeds 25,000. If the ratio X/D is less than 2, vortices will not be shed at all so that the flow measurement cannot be achieved.

As can be appreciated from the curves in the full lines, broken lines and dash-dot lines in FIGS. 7A to 7C, the apparatus according to the present invention is not influenced by the width to height ratio X'/Y of the duct of square cross-section. By selecting the ratio X/D to be within the range between 3 and 4, according to the present invention, irrespective of the flow rate, the pulse lack ratio can be substantially reduced and an accurate measurement can be effected. FIG. 8 in the left half represents curves showing the pulse lack ratio in percentage, in terms of the ratio $L_1/D$ of the length $L_1$ of the upstream portion of the partitions 7, 8 to the width D of the vortex shedding member 2 with the length $L_2$ of the downstream portion of the partitions 7, 8 to be twice the width D of the vortex shedding member 2. Further, FIG. 8 in the right half represents curves showing the pulse lack ratio in percentage, in terms of the ratio $L_2/D$ of the length $L_2$ of the downstream portion of the partitions 7, 8 to the width D of the vortex shedding member 2 with the length $L_1$ of the upstream portion of the partitions 7, 8 to be identical to the width D of the vortex shedding member 2.

As can be appreciated from FIG. 8, the pulse lack ratio are remarkably reduced when the ratio $L_1/D$ is 1 or more, and when the ratio $L_2/D$ is 2 or more. Accordingly, with the conditions $L_1/D \geq 1$ and $L_2/D \geq 2$, vortices are shed in a stable manner and a highly accurate measurement can be effected.

As is apparent from the foregoing description, the apparatus according to the present invention is capable of effecting an accurate measurement for a wide range of the fluid flow rate. Since the accuracy is not influenced by the shape of the duct and the duct need not be of extremely flat configuration, use can be made of ducts of circular or square cross-section which are readily available on market, and which can be mounted without any difficulties. The apparatus according to the present invention is particularly suitable for detecting the flow rate of the suction air to be supplied to a vehicle engine, in which the flow rate varies in a wide range and suddenly.

What is claimed is:

1. A Karman vortex type flow measuring apparatus comprising a duct through which flows a fluid whose flow rate or flow velocity is to be measured, and a columnar vortex shedding member extending within the duct transversely of the flow direction of the fluid, the flow rate or flow velocity of the fluid being measured by detecting the frequency of the vortex shedding induced by the vortex shedding member, characterized in that planar partitions are disposed within the duct on both sides of the vortex shedding member in parallel with the flow direction of the fluid and with the longitudinal direction of the vortex shedding member, the partitions being arranged such that the following condition is satisfied:

$$3 \leq X/D \leq 4$$

wherein X is the distance between the inner surfaces of the partitions and D is the width of the vortex shedding member as measured in a direction perpendicular to the flow direction of the fluid and to the longitudinal direction of the vortex shedding member.

2. The apparatus as claimed in claim 1, wherein each partition comprises a first portion extending upstream of the center portion of the vortex shedding member, and a second portion extending downstream of the center portion of the vortex shedding member, the first and the second portions of the partitions being arranged such that the following conditions are satisfied:

$$L_1/D \geq 1$$

and $$L_2/D \geq 2$$

wherein $L_1$ is the length of the first portion and $L_2$ is the length of the second portion, both length being measured in the flow direction.

* * * * *